United States Patent

[11] 3,553,491

[72] Inventor Raymond A. Schulz
Owego, N.Y.

[21] Appl. No. 790,356
[22] Filed Jan. 10, 1969
[45] Patented Jan. 5, 1971
[73] Assignee International Business Machines Corporation
Armonk, N.Y.
a corporation of New York

[54] CIRCUIT FOR SENSING BINARY SIGNALS FROM A HIGH-SPEED MEMORY DEVICE

7 Claims, 3 Drawing Figs.

[52] U.S. Cl. .......... 307/235, 307/236, 328/146, 328/150, 330/30
[51] Int. Cl. .......... H03k 5/20
[50] Field of Search .......... 307/231, 235, 236, 238; 328/146—149, 150, 151; 330/30D, 69

[56] References Cited
UNITED STATES PATENTS
3,466,471 9/1969 Flagg .......... 307/236X

*Primary Examiner*—Stanley D. Miller, Jr.
*Attorneys*—Hanifin and Jancin and John S. Gasper

ABSTRACT: A high-speed memory device sensing circuit comprises a difference amplifier having outputs connected to threshold circuit means which detects positive going voltage signals. Outputs from the threshold circuits are connected to set a pair of latches when positive going signals are detected by the threshold circuits. Means for detecting the order in which the latches are set comprises a NAND gate and a third latch connected to the output thereof which is set to produce an output signal when a binary one is read out of memory and which remains in the reset condition when a binary zero signal is read out of memory.

INVENTOR
RAYMOND A. SCHULZ

BY John S. Gasper
ATTORNEY

CIRCUIT FOR SENSING BINARY SIGNALS FROM A HIGH-SPEED MEMORY DEVICE

The invention herein described was made in the course of or under a contract with the Department of Defense.

BACKGROUND OF THE INVENTION

1. Field of the Invention

This invention relates to circuits for use with a high-speed memory device and particularly to such circuits which distinguish between binary one and zero signals read at high speed from a memory device.

2. Description of the Prior Art

In many types of memory devices, particularly NDRO memory devices, readout is performed at high speed and binary information is represented by a positive signal swing followed by a negative signal swing to represent a binary one. A binary zero is represented by a negative signal swing followed by a positive signal swing. The primary signal is the positive swing for a binary one and the negative swing for the binary zero. The negative swing for the binary one and the positive swing for the binary zero are termed the flyback and these signals are undesirable but are inherently present in memory device readout. Various approaches to eliminating flyback signals and their effects have been suggested. Some of the more common approaches are described in detail in copending application of Paul. B. Flagg, Ser. No. 517,723, now U.S. Pat. No. 3,466,471, filed Dec. 30, 1965, and assigned to the same assignee as this application. While the various approaches suggested by the prior art have application in certain technical environments, their use is somewhat limited in the technology which is directed toward integrated circuits and is particularly limited where reliability dictates that the outputs from the memory device be readily checked for errors.

SUMMARY OF THE INVENTION

It is the broad object of this invention to provide an improved circuit arrangement for reliably sensing binary ones and zeros from a high-speed memory device which overcomes the foregoing difficulties.

It is a further object of this invention to provide an improved circuit arrangement for reliably sensing binary ones and zeros from a high-speed memory device which can readily be in the form of an integrated circuit package.

It is a further object of the present invention to provide an improved sensing circuit for use with high-speed memory devices which reliably distinguishes between binary one signals and binary zero signals and which also permits ready access to the output circuitry for performing error detection.

The above and other objects are obtained in practicing the present invention by providing a sensing circuit which comprises a difference amplifier connected to the outputs of a memory device signal source with the difference amplifier having first and second outputs connected to threshold circuit means operable to detect positive going signals and to switch bistable circuit means to indicate the presence of a binary one or binary zero signal. In the preferred embodiment, the bistable circuit means comprises a pair of latches operable to be set by signals from the outputs of the threshold circuit means. The order in which the latches are set is indicative of the presence of a binary one or a binary zero signal. The order in which the latches are set is detected by a NAND gate connected to the outputs of the latches and operable to produce an output signal for setting a data latch. The connection of the NAND gate to the output latches is made so that the NAND gate produces an output pulse only when the order of switching of the latches occurs in response to a binary one signal. When a binary zero signal occurs, or when the positive swing of a flyback from the binary zero occurs, the NAND gate will not operate and will block any setting operation of the data output latch. Thus, if the data output latch has been set, a binary one is indicated; if it has not been set at readout time, a binary zero is indicated. Thus, with such an arrangement, the problems associated with flyback in binary signals is eliminated. By using latch means operable by threshold circuits which are switched by both the primary and flyback positive going signals, error detection can readily be made. In the specific configuration of the present invention, most of the component circuit elements of the circuits are readily fabricated in an integrated package without sacrificing speed and resulting in great simplification of the desired circuit.

The foregoing and other objects, features and advantages of the invention will be apparent from the following more particular description of a preferred embodiment of the invention, as illustrated in the accompanying drawings.

DESCRIPTION OF A PREFERRED EMBODIMENT

Figure 1:
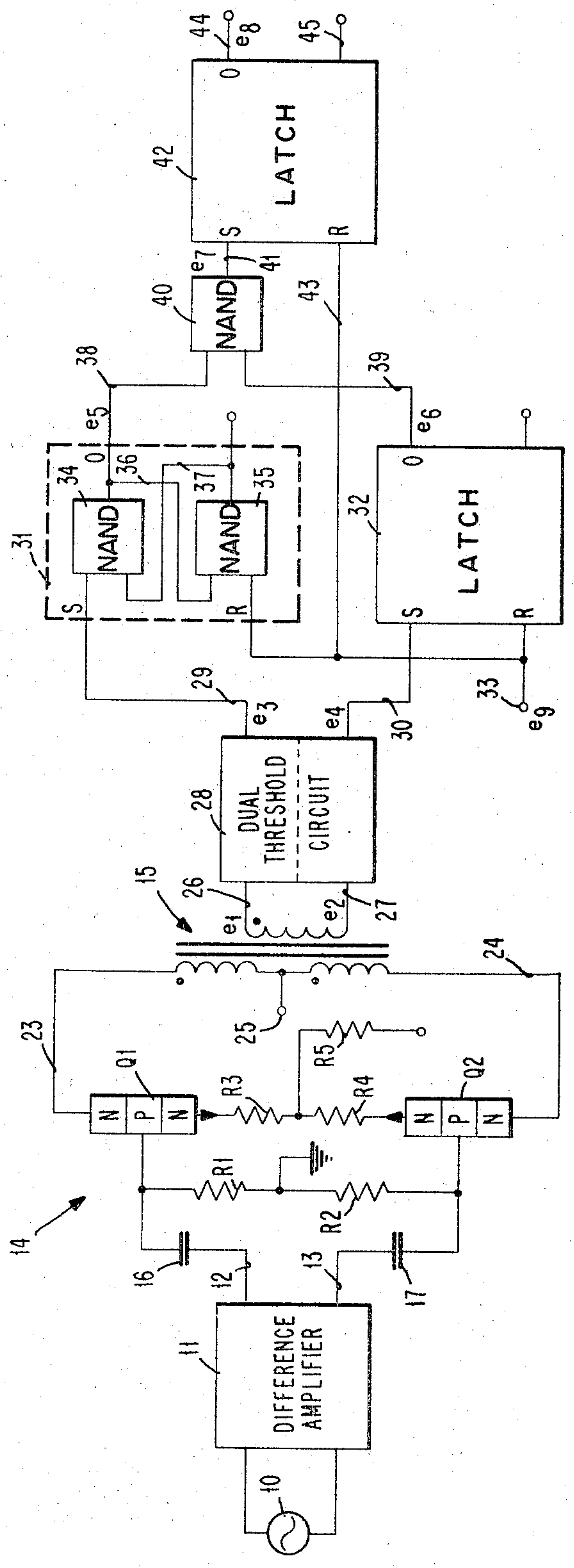
FIG. 1 illustrates, in combined block and detail form, one preferred embodiment of a sensing circuit according to this invention.

Referring to FIG. 1, a signal source 10, which may be a memory device, is coupled to a difference amplifier 11 which provides a first output on a line 12 and a second output on a line 13. A difference amplifier suitable for use herein may take various forms known in the art, and preferably could be of the type known in the trade as Type Nos. SN5510 marketed by Texas Instruments, Inc. and illustrated in their 1967—68 Integrated Circuits Catalog on page 4505. The outputs on lines 12 and 13 are further amplified by an amplifier circuit 14 and transformer 15, as shown. The amplifier circuit 14 is essentially a single-stage dual amplifier, and transformer 15 could be of the type known in the trade as Type No. 6065 marketed by Pulse Engineering, Inc. The output line 12 of difference amplifier 11 is coupled through a capacitor 16 to the base of transistor Q1. The output line 13 of difference amplifier 11 is coupled through capacitor 17 to the base of transistor Q2. Resistors R1 and R2 are connected to the base of transistors Q1 and Q2, respectively, and have a common connection to ground. The emitters of transistors Q1 and Q2 are respectively coupled through resistors R3 and R4 and a common resistor R5 to a negative bias voltage source, not shown. The collectors of transistors Q1 and Q2 are connected by lines 23 and 24 to opposite sides of the dual winding of the primary of transformer 15 which has a common point connected via terminal 25 to a positive bias voltage source, not shown. The secondary of transformer 15 is connected by lines 26 and 27 to inputs of a dual threshold circuit 28. While individual threshold circuits may be used for detecting positive going signals on lines 26 and 27, in the preferred form a dual threshold circuit 28 having dual output lines 29 and 30 is preferably used as will be more fully explained hereinafter. The first output line 29 from the threshold circuit 28 is connected to the set input of latch 31. Likewise, the second output line 30 from threshold circuit 28 is connected to the set input of latch 32. The reset inputs of latches 31 and 32 are connected to a common reset terminal 33.

In the practice of this invention, the latches 31 and 32 are preferably identical and may be of various forms or types, but preferably, as illustrated in FIG. 1, in connection with latch 31, both latch 31 and 32 comprise a pair of NAND gates 34 and 35 connected as shown. The output of NAND gate 34 is connected by a lead 36 to the first input of NAND gate 35 while lead 37 connects the output of NAND gate 35 to the second input of NAND gate 34 thereby providing bistable multivibrator operations as is well-known in the art. Specific NAND gate circuits are well-known in the art and are not further illustrated herein. However, further details of a suitable circuit for practicing the present invention may be obtained by reference to the 1967-68 Integrated Circuits Catalog published by Texas Instruments, Inc. on page 1006. As will readily be recognized by persons skilled in the art, latches 31 and 32 of FIG. 1 comprise the interconnection of two of the NAND GATE circuits illustrated in said catalog and identified as Type SN5410. The output lines 38 and 39 from latches 31 and 32, respectively, are connected to the inputs of a NAND gate 40 having an output connected via line 41 to the set input of latch 42. Latch 42 is preferably the same type of circuit arrangement as latches 31 and 32. Line 43 connects the reset input of latch 42 to terminal 33 in common with latches 31 and 32. Thus, a reset signal applied to terminal 33 resets all three latches simultaneously. Signals at output terminals 44 and/or 45 of latch 42 are representative of data signals generated by source 10.

Figure 2:
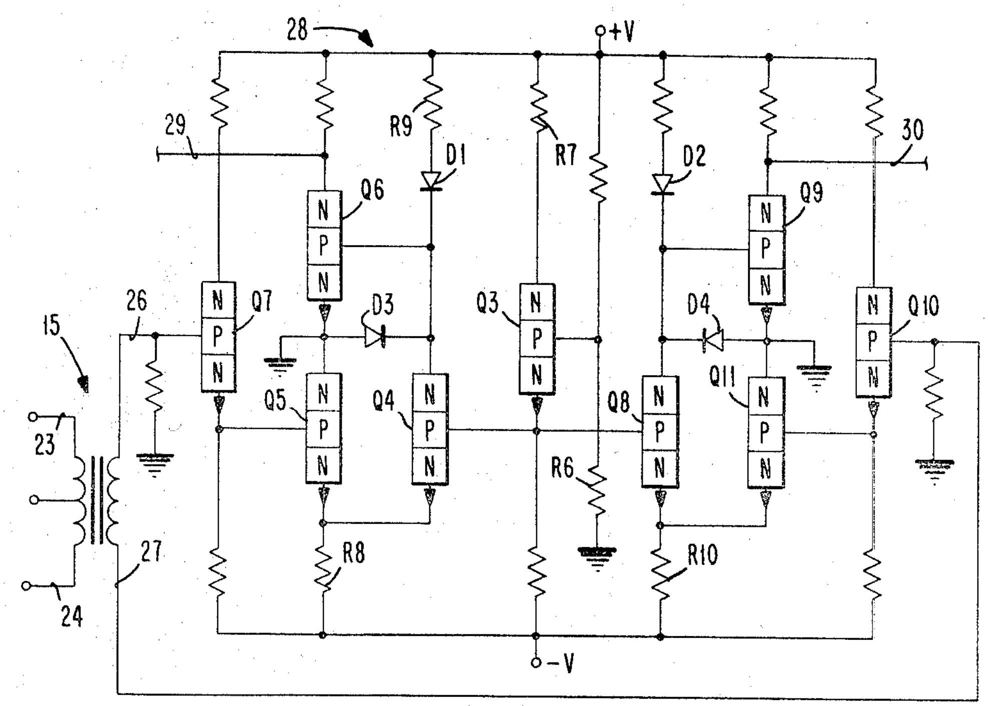
FIG. 2 illustrates in detail an embodiment of a threshold circuit means used in the sensing circuit of FIG. 1.

Reference is made next to FIG. 2 which shows the details of the dual threshold circuit 28 referred to above. Actually, threshold circuit 28, as shown in FIG. 2, comprises two identical single threshold circuits sharing a common threshold voltage generator. The left-hand side of the circuit in FIG. 2 will be described first. The threshold voltage level $V_{TH}$ is developed by the resistor divider network comprised of resistors R6 and R7 which is connected to a positive voltage and which is set at a predetermined threshold value, for example, 200 mv. The threshold voltage is applied through emitter-follower transistor Q3 to the base of transistor Q4 and is sufficiently positive with no signal present on input lines 26 and 27 from transformer 15 to cause nearly all of the current in resistor R8 to flow through transistor Q4. Transistor Q5 is essentially cutoff. Under these conditions, the collector current in transistor Q4 is large enough to cutoff transistor Q6 and cause diode D3 to conduct. With transistor Q6 cutoff, the output voltage level on line 29 is UP. When a sufficiently large positive going signal arrives on line 26 at the base of transistor Q7, transistor Q5 is turned on and transistor Q4 is cutoff. Transistor Q7 is connected as an emitter-follower and passes the signal on line 26 essentially unattenuated to the base of transistor Q5. With transistor Q4 cutoff, resistor R9 provides a current path to saturate transistor Q6. Since the input signal 26 exceeds the threshold voltage applied to transistor Q4 for only a short time, transistor Q6 remains saturated for a short time and returns to its quiescent cutoff state when the input signal to the base of transistor Q7 drops below the threshold level turning off transistors Q5 and Q6. A negative going input signal on line 26 causes transistor Q5 to become cutoff further and, therefore, does not affect circuit output on line 29.

In an identical manner, the right side of threshold circuit 28 of FIG. 2 has transistor Q8 turned on by current flow in resistor R10 with diode D4 conducting. This causes transistor Q9 to be cutoff and the voltage on output lead 30 to be UP. When a negative going signal appears on line 27, transistor Q11 remains off and no circuit response occurs. When a positive going signal for example, when a binary zero is being readout of memory or when a flyback signal appears on line 27, which exceeds the threshold $V_{TH}$ transistor Q11 conducts turning off transistor Q8. Lack of current flow through transistor Q8 causes transistor Q9 to become saturated and causes the output signal on line 30 to drop to zero. When the input signal on line 27 drops a short time later below the threshold voltage, transistor Q10 turns off transistor Q11 in turn cutting off transistor Q9 and allowing transistor Q8 to conduct thereby restoring the signal on output line 30 to the UP condition.

Figure 3:
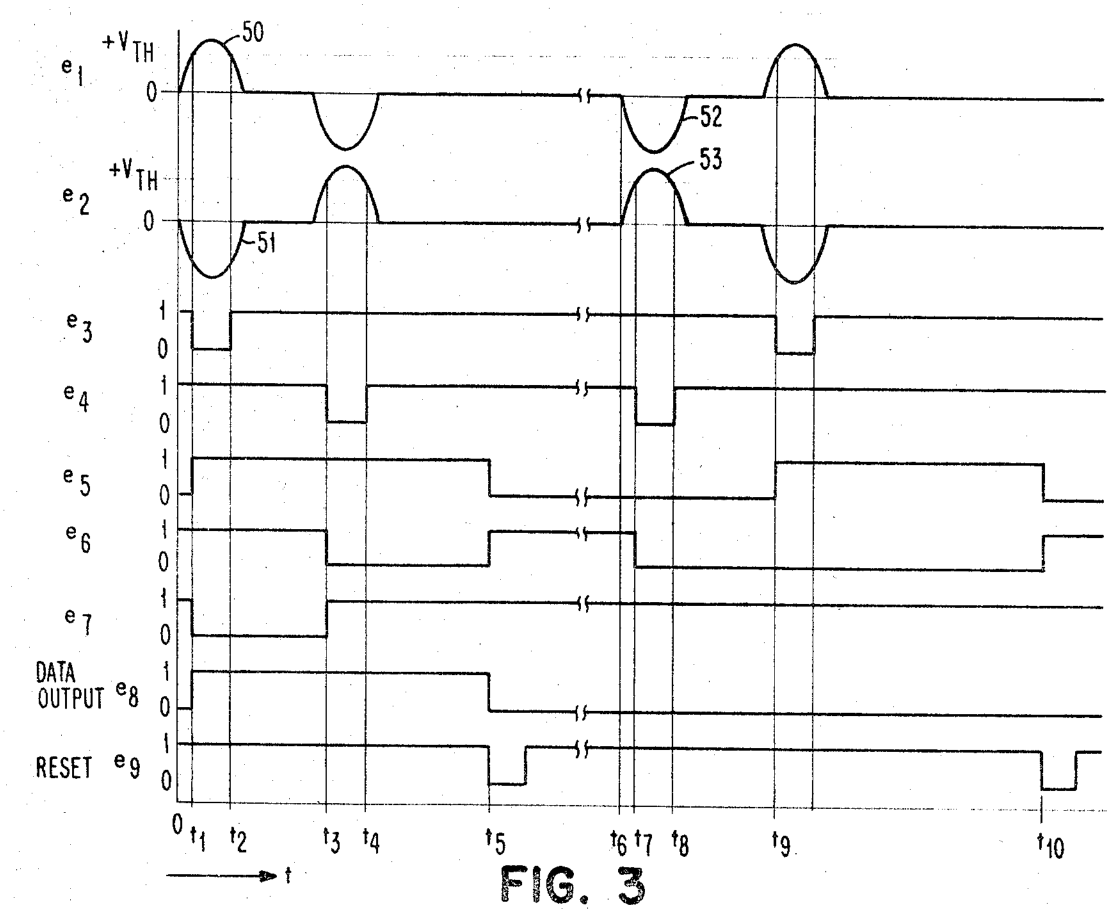
FIG. 3 illustrates waveforms of signals which occur at various places and times in the circuit of FIG. 1 and is presented to aid in the explanation of the operation of the circuits of FIGS. 1 & 2.

With reference to FIGS. 1, 2 and 3, the operation of the sensing circuit of this invention will now be explained. It is assumed that the logic has been reset by a pulse applied to terminal 33 prior to the generation of a memory signal from source 10. This means that the output voltage $e_3$ on line 29 from threshold circuit 28 is in the UP or "one" condition and the output voltage $e_4$ on line 30 is also in the one condition. With latches 31 and 32 in the reset condition, the output voltage $e_5$ on line 38 is DOWN or "zero" while the output voltage $e_6$ on line 39 is UP. With this combination of voltages on leads 38 and 39, the output voltage $e_7$ on line 41 from NAND gate 40 is UP and latch 42 remains in the reset condition with the data output signal voltage $e_8$ on line 44 in the "zero" or DOWN condition. Assuming a binary one signal has been readout of memory from source 10, input signals $e_1$ and $e_2$, illustrated by curves 50 and 51 in FIG. 3, are generated from difference amplifier 11 on leads 12 and 13 through amplifier 14 and transformer 15 to the input leads 26 and 27 of threshold circuit 28. At time $t_1$, the input signal $e_1$ on lead 26 swings through the threshold voltage $V_{th}$causing the threshold output voltage $e_3$ on lead 29 to switch from the "one" to the "-zero" state as shown in FIG. 3. The signal $e_3$ remains at "zero" until the input level of signal $e_1$ drops below the threshold voltage $V_{th}$at time $t_2$. In switching from the "one" to the "zero" level, $e_3$ sets latch 31 causing its output voltage $e_5$ on line 38 to switch from "zero" to "one." This, in turn, causes NAND gate 40 to switch its output voltage $e_7$ on line 41 to zero to set data output latch 42 to switch the output voltage $e_8$ from zero to one state at line 44. At time $t_2$, threshold output signal $e_3$ switches from zero to one when $e_1$ drops below the threshold level $V_{TH}$. At time $t_3$, the flyback portion of the input voltage signal $e_2$ on line 27 of threshold circuit 28 swings through the positive threshold voltage level $V_{TH}$ producing output signal $e_4$ on line 30 to change from the one to zero state thereby setting latch 32 to change its output voltage $e_6$ on line 39 from the one to the zero state. This causes NAND gate output $e_7$ to be switched from the zero to one state. However, since latch 42 has already been set, the switching of the output $e_7$ from NAND gate 40 on line 41 produces no change in the condition of data output latch 42. Thus, the voltage $e_8$ at terminal 44 remains in the one condition. At time $t_4$ voltage $e_2$ drops below the threshold voltage $V_{TH}$ causing threshold voltage output $e_4$ on line 30 to return to the one condition. Since latch 30 has previously been set, no change occurs in the rest of the circuit. At time $t_5$, a reset signal $e_9$ applied to terminal 33 resets latches 31, 32, and 42, thereby changing output voltage $e_5$ on line 38 from one to zero and $e_6$ on line 39 from zero to one, and $e_8$ from one to zero, thus, the circuit of FIG. 1 is totally restored to the condition that existed at time $t=0$.

For a binary zero being readout of memory, the input signals $e_1$ and $e_2$ on lines 26 and 27 to threshold circuit 28 are the converse of the signals for the binary one as illustrated by curves 52 and 53 in FIG. 3. At time $t_6$, $e_1$ is negative going and produces no change in the condition of threshold circuit output $e_3$ on line 29 and the output $e_5$ of latch 31 remains in the zero state. However, $e_2$ is positive going and at time $t_7$, arrives at the threshold voltage $V_{TH}$ causing output voltage $e_4$ on line 30 to drop from one to zero, thereby setting latch 32 to produce a change in $e_6$ on line 39 to NAND gate 40 from one to zero. This change produces no switching in the NAND gate 40 since that circuit requires both inputs on lines 38 and 39 to be one. Thus, data output latch 42 remains in set condition with the output signal $e_8$ on line 44 in the original zero state. At time $t_8$, $e_2$ drops below the threshold voltage $V_{TH}$ and the threshold output $e_4$ on line 30 is restored to the one condition. Since latch 32 has been set, no change occurs in the rest of the circuit. At time $t_9$, input signal $e_1$ on line 27 switches threshold circuit 28 to produce a change in the output voltage $e_3$ from one to zero, thereby setting latch 31 and changing $e_5$ on line 38 from zero to one. Since the output $e_6$ from latch 32 on line 39 has previously been switched from one to zero, NAND gate 40 again remains unchanged and latch 42 remains in the reset condition with voltage $e_8$ on line 44 remaining at zero. Thus, for a zero signal, data output latch 42 remains in reset condition and the voltage remains zero to indicate a binary zero. At time $t_9$, the flyback portion of $e_1$, as illustrated by curve 52, reaches the threshold voltage level $V_{TH}$ causing $e_3$ on line 29 to drop to the zero state to set latch 31 and switch its output $e_5$ from zero to one. Signal $e_6$, however, remains in the zero condition and NAND gate 40 produces no voltage change in signal $e_7$. Consequently, latch 42 again remains in the reset state. At time $t_{10}$, reset signal $e_9$ is applied to terminal 33 to reverse the settings of latches 31 and 32 such that output voltage $e_5$ switches from one to zero and output $e_6$ switches from zero to one. Thus, the circuit is again reset to the total condition existing at the time $t=0$.

It will be apparent from the above description that problems associated with flyback signals when a binary zero signal is readout of memory is readily disposed of without undue complexity in the electronics circuit elements employed. In addition, the circuits described are capable of very high-speed memory operation so that special timing problems are eliminated. By using threshold circuits amplitude response problems are further disposed of and detection of binary one signals and binary zero signal are reliably obtained.

Since the method of discriminating between a one and zero basically consists of determining which of the latches 31 or 32 was set first, using this detection technique there is an opportunity to detect memory readout errors. For example, if latch 31 output $e_5$ on line 38 was set from zero to one at time $t_1$, latch 32 output $e_6$ on line 39 should become set from one to zero at time $t_3$. If latch 32 remains one after time $t_3$, then it can be assumed that an error in reading has occured. Conversely, when reading a zero, if latch 32 output $e_6$ on line 39 sets to a zero at time $t_7$, then latch output $e_5$ on line 38 should set to a one at time $t_9$. If latch 31 output $e_5$ on line 38 remains at zero after time $t_9$, then a readout error has occurred. Another detectable error is the case where latch 31 output $e_5$ on line 38 is set to a one simultaneously with latch 32 output $e_6$ on line 39 being set to a zero. This error can be detected by noting an insufficient elapsed time period between the setting of the two latches 31 and 32. Means for implementing the automatic error detection noted above is not shown, but could readily be implemented by one skilled in the art using logic circuits such as the type SN5410 and/or other similar circuits.

While the invention has been particularly shown and described with reference to a preferred embodiment thereof, it will be understood by those skilled in the art that various changes in form and details may be made therein without departing from the spirit and scope of the invention.

I claim:

1. A circuit arrangement for sensing input signals representing binary ones and zeros including:

a difference amplifier having a first output line and a second output line;

threshold circuit means for detecting a predetermined positive voltage level on said first and second output lines;

bistable circuit means switchable in sequence by said threshold circuit means in response to positive voltages above said predetermined voltage on said first and second output lines; and means for determining the sequence of switching of said bistable circuit means as an indication of the existence of a binary one or zero input signal.

2. A circuit arrangement in accordance with claim 1 in which said bistable circuit means comprises latch means operable to generate a sequence of output signals in response to switching pulses from said threshold circuit means.

3. A circuit arrangement in accordance with claim 2 in which said bistable circuit means comprises a first and second latch means, said latch means being connected to said threshold means to be set in a sequence, and said sequence determining means comprises circuitry for determining the order of setting of said first and second latch means.

4. A circuit arrangement in accordance with claim 3 in which said sequence determining means comprises a gate circuit means operable to generate a signal in response to a first sequence of setting of said first and second latch means and to generate no signal in response to a second sequence of setting of said latch means; and circuit means operable in response to said gate circuit means output signal switchable to indicate said first sequence of operation of said latches.

5. A circuit arrangement in accordance with claim 4 in which said sequence determining means comprises a bistable latch circuit settable to a predetermined condition by said gate circuit means.

6. A circuit arrangement in accordance with claim 5 in which said threshold circuit means comprises first and second threshold circuits connected to said first and second outputs of said difference amplifier means and operable to generate output set signals to said first and second latch means in response to positive going signals above a predetermined voltage level on said first and second outputs of said difference amplifier means.

7. A circuit arrangement in accordance with claim 6 in which said threshold circuit means comprises first and second threshold circuits connected to share a common voltage level generator.